United States Patent
Moriya et al.

(10) Patent No.: US 9,624,337 B2
(45) Date of Patent: Apr. 18, 2017

(54) ONE-COMPONENT TYPE CURABLE COMPOSITION AND ONE-COMPONENT TYPE WATERPROOFING MATERIAL

(71) Applicant: AUTO CHEMICAL INDUSTRY CO., LTD., Tokyo (JP)

(72) Inventors: Masahiro Moriya, Suita (JP); Masakazu Kikuchi, Kasumigaura (JP)

(73) Assignee: AUTO CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/969,220

(22) Filed: Dec. 15, 2015

(65) Prior Publication Data

US 2016/0168313 A1 Jun. 16, 2016

(30) Foreign Application Priority Data

Dec. 16, 2014 (JP) ................. 2014-253941

(51) Int. Cl.

| | | |
|---|---|---|
| *C08G 18/83* | (2006.01) | |
| *C08G 18/48* | (2006.01) | |
| *C08G 18/66* | (2006.01) | |
| *C08G 18/67* | (2006.01) | |
| *C08G 18/73* | (2006.01) | |
| *C08G 18/75* | (2006.01) | |
| *C08G 18/22* | (2006.01) | |
| *C08G 18/26* | (2006.01) | |
| *C08G 18/28* | (2006.01) | |
| *C08G 18/36* | (2006.01) | |

(52) U.S. Cl.
CPC ......... *C08G 18/833* (2013.01); *C08G 18/222* (2013.01); *C08G 18/227* (2013.01); *C08G 18/26* (2013.01); *C08G 18/285* (2013.01); *C08G 18/36* (2013.01); *C08G 18/4808* (2013.01); *C08G 18/4879* (2013.01); *C08G 18/6696* (2013.01); *C08G 18/67* (2013.01); *C08G 18/73* (2013.01); *C08G 18/755* (2013.01); *C08G 2190/00* (2013.01)

(58) Field of Classification Search
CPC C08G 18/833; C08G 18/755; C08G 18/4879; C08G 18/6696; C08G 18/67; C08G 18/73; C08G 18/36; C08G 18/222; C08G 18/227; C08G 18/26; C08G 18/285; C08G 18/4808; C08G 2190/00

USPC ........................................... 525/453
See application file for complete search history.

(56) References Cited

U.S. PATENT DOCUMENTS

| | | | | |
|---|---|---|---|---|
| 2005/0182225 A1* | 8/2005 | Sato | ............. | C08G 18/10 528/18 |
| 2006/0189736 A1* | 8/2006 | Mori | ............. | C08L 101/10 524/404 |
| 2009/0081437 A1* | 3/2009 | Mizutani | ......... | C08F 283/006 428/220 |
| 2012/0314276 A1* | 12/2012 | Nomura | ......... | C08G 18/3206 359/296 |
| 2013/0101744 A1* | 4/2013 | Yano | ............. | C04B 41/009 427/407.2 |
| 2013/0122287 A1* | 5/2013 | Moeller | ......... | C08G 18/12 428/339 |
| 2014/0256842 A1* | 9/2014 | Kobayashi | ..... | B32B 7/12 522/174 |
| 2014/0302307 A1* | 10/2014 | Steinmetz | ..... | B05D 7/14 428/323 |

FOREIGN PATENT DOCUMENTS

| | | |
|---|---|---|
| JP | 2005-206722 A | 8/2005 |
| JP | 2007-284547 A | 11/2007 |
| JP | 2007-289849 A | 11/2007 |
| JP | 2007-291223 A | 11/2007 |
| JP | 2009-073882 A | 4/2009 |
| JP | 2011-236312 A | 11/2011 |

\* cited by examiner

*Primary Examiner* — Mike M Dollinger
(74) *Attorney, Agent, or Firm* — Westerman, Hattori, Daniels & Adrian, LLP

(57) ABSTRACT

A one-component type curable composition includes: an isocyanate group-containing urethane prepolymer (A) obtained by allowing a polyoxyalkylene-based polyol (a-1) having a number average molecular weight of 1,000 or more and less than 3,000, a polyol (a-2) having a number average molecular weight of less than 1,000, an epoxy (meth) acrylate (a-3) containing two or more hydroxyl groups in one molecule, and isophorone diisocyanate (a-4) to react with each other; a compound (B) having an oxazolidine ring; a first curing accelerator (C) configured to accelerate a reaction between at least one of a secondary amino group or a hydroxyl group generated by hydrolysis of the (B) and an isocyanate group of the (A); and a second curing accelerator (D) configured to accelerate the hydrolysis of the (B).

6 Claims, No Drawings

ONE-COMPONENT TYPE CURABLE COMPOSITION AND ONE-COMPONENT TYPE WATERPROOFING MATERIAL

BACKGROUND OF THE INVENTION

Field of the Invention

The present invention relates to a one-component type curable composition and a one-component type waterproofing material, which enable a cured product being excellent in weather resistance and having high tensile strength and rubber hardness to be obtained and which have excellent foaming-inhibiting performance.

Description of the Related Art

Hitherto, a curable composition containing an isocyanate group-containing urethane prepolymer has been widely used in applications to, for example, an outer wall waterproofing sealing material for an architectural structure constructed by ceramic siding or the like, and an adhesive for construction members including a resin sheet, such as a vinyl chloride sheet, a tile, and a wood plate, by virtue of advantages such as the ease of working, high adhesiveness after curing, and the wide-range regulation of rubber elastic properties after curing from a low modulus to a high modulus (high stretch to low stretch). The curable composition containing an isocyanate group-containing urethane prepolymer is roughly classified into a one-component type that contains an isocyanate group-containing urethane prepolymer and is allowed to react with water in air to be cured and a two-component type in which a base compound containing an isocyanate group-containing urethane prepolymer and a curing agent containing an active hydrogen compound are mixed to be cured during construction.

The one-component type curable composition containing an isocyanate group-containing urethane prepolymer does not require a mixing operation during construction, and hence the one-component type curable composition has advantages in that the workability can be simplified and curing failure caused by a mixing mistake can be prevented. However, when the concentration of an isocyanate group is high, or the curing speed is increased, the amount of carbon dioxide to be generated is increased, or carbon dioxide is generated rapidly, for example, to thereby generate air bubbles in a cured product. Therefore, there are problems of the occurrence of troubles such as degradation in outer appearance, decrease in rubber tensile properties such as stretch, and decrease in adhesiveness. As means for solving the problems, the applicant of the present application has previously proposed technologies each involving blending an oxazolidine compound as a latent curing agent into an isocyanate group-containing urethane prepolymer (Japanese Patent Application Laid-Open Nos. 2005-206722, 2007-284547, 2007-291223, 2009-073882, and 2011-236312).

Further, the applicant of the present application has previously proposed a one-component type polyurethane waterproofing material composition using isophorone diisocyanate, which can be used for a waterproofing construction method having a feature of not applying a topcoat (Japanese Patent Application Laid-Open No. 2007-289849). However, this composition uses an alicyclic isocyanate as a raw material, and hence there is a problem in that rubber hardness and mechanical strength are inferior to those in the case of using an aromatic isocyanate.

Meanwhile, the two-component type is mainly used when high weather resistance, tensile strength, and rubber hardness higher than those disclosed in Japanese Patent Application Laid-Open Nos. 2005-206722, 2007-284547, 2007-291223, 2009-073882, 2011-236312, and 2007-289849 are required.

In Japanese Patent Application Laid-Open No. 2008-222792, there is a disclosure of a two-component type urethane resin composition including: a component that contains in a particular ratio an isocyanate group-terminated urethane prepolymer, which is obtained by allowing a polyoxyalkylene polyol having a number average molecular weight of 1,000 or more and a low-molecular-weight polyol having a number average molecular weight of less than 1,000 to react with an aliphatic and/or alicyclic polyisocyanate, and a urethane polyoxazolidine compound, which is obtained by allowing an N-hydroxyalkyloxazolidine in an amount of from 0.9 mol to 1.1 mol in terms of a hydroxyl group conversion with respect to 1 mol of an isocyanate group of an aliphatic and/or alicyclic polyisocyanate to react with the polyisocyanate; and a component containing water. In Japanese Patent Application Laid-Open No. 2008-222792, the problem in that an inside of the one-component type curable composition is not cured sufficiently, the problem in that storage stability is degraded owing to water contained in a filler, and the like cannot be solved in the one-component type curable composition, and hence the two-component type curable composition is used. Further, sufficient tensile strength is not exhibited in physical properties of a cured product in Examples.

SUMMARY OF THE INVENTION

The present invention has been made in view of the above-mentioned problems, and it is an object of the present invention to provide a one-component type curable composition and a one-component type waterproofing material, which enable a cured product being excellent in weather resistance without requiring a topcoat and having high tensile strength and rubber hardness to be obtained in a one-component type excellent in workability, and which have excellent foaming-inhibiting performance.

The inventors of the present invention have made extensive investigations, and as a result, have found that the following curable composition is effective. Specifically, the present invention is as described in the following items (1) to (6).

(1) A one-component type curable composition, including: an isocyanate group-containing urethane prepolymer (A) obtained by allowing a polyoxyalkylene-based polyol (a-1) having a number average molecular weight of 1,000 or more and less than 3,000, a polyol (a-2) having a number average molecular weight of less than 1,000, an epoxy (meth)acrylate (a-3) containing two or more hydroxyl groups in one molecule, and isophorone diisocyanate (a-4) to react with each other; a compound (B) having an oxazolidine ring; a first curing accelerator (C) configured to accelerate a reaction between at least one of a secondary amino group or a hydroxyl group generated by hydrolysis of the compound (B) having an oxazolidine ring and an isocyanate group of the isocyanate group-containing urethane prepolymer (A); and a second curing accelerator (D) configured to accelerate the hydrolysis of the compound (B) having an oxazolidine ring, in which a cured product obtained by curing the one-component type curable composition with water satisfies the following (I) to (III): (I) type D durometer hardness specified under JIS K 6253-3 is D40 or more; (II) tensile strength at 23° C. specified under JIS A 6021 is 10 N/mm² or more; and (III) accelerated weather resistance specified under JIS K 5658 complies with a first class.

(2) A one-component type curable composition according to the item (1), in which the polyol (a-2) having a number average molecular weight of less than 1,000 is a bisphenol skeleton-containing polyether polyol obtained by allowing an alkylene oxide having 2 to 4 carbon atoms to react with a bisphenol compound.

(3) A one-component type curable composition according to the item (1) or (2), in which the second curing accelerator (D) is an alicyclic acid anhydride.

(4) A one-component type curable composition according to any one of the items (1) to (3), in which the first curing accelerator (C) is an iron chelate compound.

(5) A one-component type curable composition according to any one of the items (1) to (4), in which the compound (B) having an oxazolidine ring is a urethane bond-containing oxazolidine compound.

(6) A one-component type waterproofing material, including the one-component type curable composition of any one of the items (1) to (5).

With the above-mentioned configuration, in spite of a one-component type, the one-component type curable composition of the present invention exhibits the following effects. The one-component type curable composition enables a cured product being excellent in weather resistance without requiring a topcoat and having high tensile strength and rubber hardness to be obtained and has excellent foaming-inhibiting performance.

Further features of the present invention will become apparent from the following description of exemplary embodiments.

DESCRIPTION OF THE EMBODIMENTS

The present invention is described below in detail.

A one-component type curable composition of the present invention includes: an isocyanate group-containing urethane prepolymer (A) obtained by allowing a polyoxyalkylene-based polyol (a-1) having a number average molecular weight of 1,000 or more and less than 3,000, a polyol (a-2) having a number average molecular weight of less than 1,000, an epoxy (meth)acrylate (a-3) containing two or more hydroxyl groups in one molecule, and isophorone diisocyanate (a-4) to react with each other; a compound (B) having an oxazolidine ring; a first curing accelerator (C) configured to accelerate a reaction between at least one of a secondary amino group or a hydroxyl group generated by hydrolysis of the compound (B) having an oxazolidine ring and an isocyanate group of the isocyanate group-containing urethane prepolymer (A); and a second curing accelerator (D) configured to accelerate the hydrolysis of the compound (B) having an oxazolidine ring, in which a cured product obtained by curing the one-component type curable composition with water satisfies the following (I) to (III): (I) type D durometer hardness specified under JIS K 6253-3 is D40 or more; (II) tensile strength at 23° C. specified under JIS A 6021 is 10 N/mm² or more; and (III) accelerated weather resistance specified under JIS K 5658 complies with a first class.

<Regarding Component (A)>

The isocyanate group-containing urethane prepolymer (A) contained in the one-component type curable composition of the present invention is obtained by allowing the polyoxyalkylene-based polyol (a-1) having a number average molecular weight of 1,000 or more and less than 3,000 (hereinafter sometimes referred to as "polyoxyalkylene-based polyol (a-1)"), the polyol (a-2) having a number average molecular weight of less than 1,000 (hereinafter sometimes referred to as "polyol (a-2)"), the epoxy (meth) acrylate (a-3) containing two or more hydroxyl groups in one molecule (hereinafter sometimes referred to as "epoxy (meth)acrylate (a-3) containing two or more hydroxyl groups"), and isophorone diisocyanate (a-4) to react with each other under the condition that an isocyanate group of the isophorone diisocyanate (a-4) is excessive with respect to an alcoholic hydroxyl group of a raw material (that is, a total amount of hydroxyl groups of the polyoxyalkylene-based polyol (a-1), the polyol (a-2), and the epoxy (meth) acrylate (a-3) containing two or more hydroxyl groups). Specifically, the isocyanate group-containing urethane prepolymer (A) can be produced by allowing the above-mentioned components to react with each other simultaneously or sequentially within a range in which a reaction molar ratio of the number of moles of an isocyanate group with respect to the number of moles of a hydroxyl group (=number of moles of an isocyanate group/number of moles of a hydroxyl group) is from 1.1 to 5.0, preferably from 2.0 to 4.0, most preferably from 2.5 to 3.5, to thereby cause the isocyanate group to remain in the isocyanate group-containing urethane prepolymer (A). It is not preferred that the reaction molar ratio be less than 1.1 because the molecular weight becomes excessively large to increase viscosity, which degrades workability. It is not preferred that the reaction molar ratio be more than 5.0 because there is a tendency that the generation amount of carbon dioxide increases at time of reaction with water, such as moisture, to make it difficult to inhibit foaming.

The isocyanate group content in the isocyanate group-containing urethane prepolymer (A) is preferably from 0.1 mass % to 15.0 mass %, particularly preferably from 0.3 mass % to 10.0 mass %, most preferably from 1.0 mass % to 5.0 mass %. In the case where the isocyanate group content is less than 0.1 mass %, viscosity increases and workability is degraded for the same reason as the above. It is not preferred that the isocyanate group content be more than 15.0 mass %, either, because there is a tendency that it becomes difficult to inhibit foaming due carbon dioxide for the same reason as the above.

As a specific production method for the isocyanate group-containing urethane prepolymer (A), there is given a method involving loading the polyoxyalkylene-based polyol (a-1), the polyol (a-2), the epoxy (meth)acrylate (a-3) containing two or more hydroxyl groups, and the isophorone diisocyanate (a-4) into a reaction vessel made of, for example, glass or stainless steel and allowing the components to react with each other with stirring at from 50° C. to 120° C. in the presence or absence of a reaction catalyst or an organic solvent described later. In this case, when an isocyanate group reacts with moisture, the isocyanate group-containing urethane prepolymer (A) to be obtained is thickened. Therefore, it is preferred that the reaction be performed under a state of blocking moisture, such as a nitrogen gas displacement state or a nitrogen gas stream state.

<Regarding Component (a-1)>

It is necessary that the polyoxyalkylene-based polyol (a-1) serving as a raw material for the isocyanate group-containing urethane prepolymer (A) have a number average molecular weight of 1,000 or more and less than 3,000. When the number average molecular weight is less than 1,000, the curable composition to be obtained is foamed during curing, and when the number average molecular weight is more than 3,000, the hardness after curing of the curable composition to be obtained decreases. The term "number average molecular weight" as used herein refers to a number average molecular weight in terms of polystyrene measured by gel permeation chromatography (GPC).

It should be noted that the term "based" of the polyoxyalkylene-based polyol means that, as long as 50 mass % or more, preferably 80 mass % or more, particularly preferably 90 mass % or more of a portion excluding a hydroxyl group in 1 mol of molecules is formed of polyoxyalkylene, the balance may be modified with an ester, urethane, polycarbonate, polyamide, poly(meth)acrylate, polyolefin, or the like. It is most preferred that 95 mass % or more of the molecules excluding a hydroxyl group be formed of polyoxyalkylene.

Examples of the polyoxyalkylene-based polyol (a-1) include: low-molecular-weight polyols, such as ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, dipropylene glycol, 1,4-cyclohexanedimethanol, an ethylene oxide or propylene oxide adduct of bisphenol A, trimethylolpropane, glycerin, and pentaerythritol; low-molecular-weight polyamines, such as butylenediamine, hexamethylene diamine, xylylenediamine, and isophoronediamine; low-molecular-weight amino alcohols, such as monoethanolamine and diethanolamine; polycarboxylic acids, such as succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, naphthalenedicarboxylic acid, and trimellitic acid; saccharide-based low-molecular-weight polyhydric alcohols, such as sorbitol, mannitol, sugar (sucrose), and glucose; polyoxyethylene-based polyol, polyoxypropylene-based polyol, polyoxybutylene-based polyol, polyoxytetramethylene-based polyol, poly-(oxyethylene)-(oxypropylene)-random or block copolymer-based polyol, which are obtained by ring-opening addition polymerization or copolymerization of one or more kinds of cyclic ether compounds, such as ethylene oxide, propylene oxide, butylene oxide, and tetrahydrofuran, using one or more kinds of low-molecular-weight polyphenols, such as bisphenol A and bisphenol F, as an initiator; and polyester ether polyol and polycarbonate ether polyol using polyester polyol and polycarbonate polyol as an initiator. Further, there is given a polyol having a hydroxyl group at a molecular end obtained by allowing any of the various polyols described above and an organic isocyanate to react with each other under the condition that a hydroxyl group is excessive with respect to an isocyanate group. Of those, from the viewpoints of the workability of the curable composition to be obtained and the satisfactory stretch after curing of the curable composition to be obtained, polyoxypropylene polyol is preferred.

The number of alcoholic hydroxyl groups in the polyoxyalkylene-based polyol (a-1) is preferably 2 or more, more preferably from 2 to 4, particularly preferably from 2 to 3 on average per molecule.

Further, it is preferred that the polyoxyalkylene-based polyol (a-1) be obtained through use of, as a catalyst during its production, a cesium alkoxide such as cesium methoxide or cesium ethoxide, a cesium-based compound such as cesium hydroxide, diethyl zinc, iron chloride, metal porphyrin, a phosphazenium compound, or a composite metal cyanide complex, or the like, in particular, a composite metal cyanide complex such as a glyme complex or a diglyme complex of zinc hexacyanocobaltate and have a total unsaturation degree of 0.1 meq/g or less, further 0.07 meq/g or less, particularly 0.04 meq/g or less and a narrow molecular weight distribution [ratio between a weight average molecular weight (Mw) and a number average molecular weight (Mn) in terms of polystyrene measured by gel permeation chromatography (GPC)=Mw/Mn] of 1.6 or less, in particular, from 1.0 to 1.3, from the viewpoints that the viscosity of the isocyanate group-containing urethane prepolymer to be obtained can be reduced, and the rubber elastic properties after curing of the curable composition to be obtained become satisfactory.

<Regarding Component (a-2)>

It is necessary that the polyol (a-2) serving as a raw material for the isocyanate group-containing urethane prepolymer (A) have a number average molecular weight in terms of polystyrene measured by gel permeation chromatography (GPC) of less than 1,000. When the number average molecular weight is 1,000 or more, the hardness after curing of the curable composition to be obtained decreases.

Examples of the polyol (a-2) include: low-molecular-weight polyols, such as ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, dipropylene glycol, 1,4-cyclohexanedimethanol, trimethylolpropane, glycerin, and pentaerythritol; animal and plant-based polyols, such as bisphenol skeleton-containing polyether polyol, polyester polyol, polycarbonate polyol, polyoxyalkylene-based polyol, hydrocarbon-based polyol, and castor oil; and copolyols thereof. It should be noted that the bisphenol skeleton refers to a divalent group represented by the following formula (i), and the bisphenol skeleton-containing polyether polyol is obtained by allowing an alkylene oxide to react with a bisphenol compound. Of those, from the viewpoints of the workability of the curable composition to be obtained, and the satisfactory tensile strength after curing of the curable composition to be obtained, bisphenol skeleton-containing polyether polyol is preferred, and bisphenol skeleton-containing polyether polyol obtained by allowing an alkylene oxide having 2 to 4 carbon atoms to react with a bisphenol compound is particularly preferred.

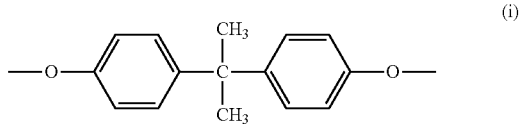

(i)

<(Regarding Component (a-3)>

The epoxy (meth)acrylate (a-3) containing two or more hydroxyl groups in one molecule serving as a raw material for the isocyanate group-containing urethane prepolymer (A) is a compound obtained by allowing all the epoxy groups in an epoxy compound containing two or more epoxy groups in one molecule to react with (meth)acrylic acid. As the epoxy compound containing two or more epoxy groups in one molecule, for example, there is given diglycidyl ether ("Epolite Series" manufactured by Kyoeisha Chemical Co., Ltd.). It should be noted that the term "(meth)acrylate" as used herein refers to acrylate and methacrylate, and the term "(meth)acrylic acid" as used herein refers to acrylic acid and methacrylic acid.

Examples of marketed products of the epoxy (meth) acrylate containing two or more hydroxyl groups in one molecule include EPOXY ESTER M-600A, EPOXY ESTER 40EM, EPOXY ESTER 70PA, EPOXY ESTER 200PA, EPOXY ESTER 80MFA, EPOXY ESTER 3002M, EPOXY ESTER 3002A, EPOXY ESTER 3000MK, and EPOXY ESTER 3000A (all of which are manufactured by Kyoeisha Chemical Co., Ltd.), DENACOL ACRYLATE DA-212, DENACOL ACRYLATE DA-250, DENACOL ACRYLATE DA-314, DENACOL ACRYLATE DA-721, DENACOL ACRYLATE DA-722, DENACOL ACRYLATE DA-911M, DENACOL ACRYLATE DA-920, DENACOL ACRYLATE DA-931, DENACOL ACRYLATE DM-201, DENACOL ACRYLATE DM-811, DENACOL ACRYLATE DM-832, and DENACOL ACRYLATE DM-851 (all of which are manufactured by Nagase ChemteX Corporation).

<Mixing Ratio of (a-1) to (a-3)>

The mixing ratio of the polyoxyalkylene-based polyol (a-1), the polyol (a-2), and the epoxy (meth)acrylate (a-3) containing two or more hydroxyl groups, each serving as a raw material for the isocyanate group-containing urethane prepolymer (A), is, for example, (a-1):(a-2):(a-3)=20 to 40:1 to 10:1 on a mass basis. It should be noted that the isophorone diisocyanate (a-4) is set to such an amount that the isocyanate group of the isophorone diisocyanate (a-4) becomes excessive with respect to the alcoholic hydroxyl group of the raw material, as described above.

Through incorporation of the isocyanate group-containing urethane prepolymer (A) as described above, which is obtained by allowing the polyoxyalkylene-based polyol (a-1), the polyol (a-2), the epoxy (meth)acrylate (a-3) containing two or more hydroxyl groups, and the isophorone diisocyanate (a-4) to react with each other, into the one-component type curable composition together with the compound (B) having an oxazolidine ring, the first curing accelerator (C), and the second curing accelerator (D) described later in detail, a cured product being excellent in weather resistance and having high tensile strength and rubber hardness can be obtained, and excellent foaming-inhibiting performance can be obtained.

<Regarding Component (B)>

The compound (B) having an oxazolidine ring is a compound having, in the molecule, 1 or more, preferably 2 to 6 oxazolidine rings, each being a saturated five-membered heterocycle containing an oxygen atom and a nitrogen atom. The compound (B) having an oxazolidine ring is subjected to hydrolysis by reacting with water (moisture) in the atmosphere or the like to cause the oxazolidine ring to generate (reproduce) a secondary amino group and an alcoholic hydroxyl group, to thereby serve as a latent curing agent for the isocyanate group-containing urethane prepolymer (A).

When an isocyanate group of the isocyanate group-containing urethane prepolymer (A) reacts with water (moisture) in the atmosphere or the like, the isocyanate group-containing urethane prepolymer (A) is cured through generation of a urea bond. In this case, carbon dioxide is also generated, and air bubbles due to carbon dioxide are formed in the cured product, with the result that troubles such as degradation in outer appearance, fracture of the cured product, and decrease in adhesiveness occur. However, in the case where a mixture containing the isocyanate group-containing urethane prepolymer (A) and the compound (B) having an oxazolidine ring is exposed to water, the oxazolidine ring of the compound (B) having an oxazolidine ring is subjected to hydrolysis with the water before the water and the isocyanate group react with each other, and a secondary amino group and an alcoholic hydroxyl group that are active hydrogen are generated. The active hydrogen reacts with the isocyanate group to form a cured product without generating carbon dioxide, and thus, foaming due to carbon dioxide in the one-component type curable composition of the present invention containing the components (A) and (B) can be inhibited.

Further, when an isocyanate group-containing urethane prepolymer using isophorone diisocyanate as a raw material reacts with only water, the curing speed is significantly delayed. However, through use of the compound (B) having an oxazolidine ring, there is also an effect that the curing speed can be increased, because the reaction speed of the reaction between a secondary amino group generated by the reaction of the compound (B) having an oxazolidine ring with water and an isocyanate group derived from the isophorone diisocyanate is higher than that of the reaction with water.

Specific examples of the compound (B) having an oxazolidine ring include: a urethane bond-containing oxazolidine compound or an ester group-containing oxazolidine compound obtained by allowing a hydroxyl group of a compound having a hydroxyl group and an oxazolidine ring to react with an isocyanate group of an organic isocyanate compound or a carboxyl group of an organic carboxylic acid compound; oxazolidine silyl ether; and carbonate group-containing oxazolidine. From the viewpoint of ease of production and low viscosity, a urethane bond-containing oxazolidine compound is preferred.

An example of the urethane bond-containing oxazolidine compound is a compound obtained by using a hydroxyl group of the compound having a hydroxyl group and an oxazolidine ring and an isocyanate group of the organic isocyanate compound so that a molar ratio of the isocyanate group to the hydroxyl group falls within a range of from 0.9 to 1.2, preferably from 0.95 to 1.05 and allowing those groups to react with each other in the presence or absence of an organic solvent at a temperature of from 50° C. to 100° C.

Examples of the organic isocyanate compound to be used for synthesis of the urethane bond-containing oxazolidine compound include: an aromatic polyisocyanate in which an isocyanate group is bonded to aromatic hydrocarbon; an aromatic-aliphatic polyisocyanate which has an aromatic ring and in which an isocyanate group is bonded to an aliphatic hydrocarbon group; and an aliphatic polyisocyanate having only an isocyanate group and an aliphatic hydrocarbon group.

Examples of the aromatic polyisocyanate include: diphenylmethane diisocyanates (MDIs), such as 4,4'-diphenylmethane diisocyanate, 2,4'-diphenylmethane diisocyanate, or a mixture thereof; toluene diisocyanates (TDIs), such as 2,4-toluene diisocyanate, 2,6-toluene diisocyanate, or a mixture thereof; and phenylene diisocyanate, diphenyl diisocyanate, naphthalene diisocyanate, and diphenyl ether diisocyanate.

An example of the aromatic-aliphatic polyisocyanate is xylylene diisocyanate.

Examples of the aliphatic polyisocyanate include: aliphatic polyisocyanates, such as hexamethylene diisocyanate, pentamethylene diisocyanate, propylene diisocyanate, and butylene diisocyanate; and alicyclic polyisocyanates, such as cyclohexane diisocyanate, methylene bis(cyclohexyl isocyanate), and isophorone diisocyanate.

In addition, the examples also include carbodiimide-modified products, biuret-modified products, allophanate-modified products, dimers, and trimers of those diisocyanates, and polymethylene polyphenyl polyisocyanate (crude MDI, polymeric MDI), and these may be used alone, or two or more kinds thereof may be used in combination.

Of those, from the viewpoints that the crystallization degree of the urethane bond-containing oxazolidine compound can be reduced, and the workability of the curable composition to be obtained can be made satisfactory, an aliphatic polyisocyanate is preferred, and hexamethylene diisocyanate is particularly preferred.

A specific example of the compound having a hydroxyl group and an oxazolidine ring is an N-hydroxyalkyloxazolidine obtained by a dehydration condensation reaction between a secondary amino group of an alkanolamine and a carbonyl group of a ketone compound or an aldehyde compound. As a synthesis method for the compound having a hydroxyl group and an oxazolidine ring, there is given a method involving using 1.0 mol or more, preferably 1.0-fold mol to 1.5-fold mol, more preferably 1.0-fold mol to 1.2-fold mol of the carbonyl group of the aldehyde or the ketone with respect to 1.0 mol of the secondary amino group of the alkanolamine, and performing a dehydration condensation reaction while heating and refluxing the above-mentioned components in a solvent, such as toluene or xylene, and removing water generated as a by-product.

Examples of the alkanolamine include diethanolamine, dipropanolamine, and N-(2-hydroxyethyl)-N-(2-(hydroxypropyl)amine. Examples of the ketone compound include acetone, diethyl ketone, isopropyl ketone, methyl ethyl ketone, methyl propyl ketone, methyl isopropyl ketone, methyl butyl ketone, isobutyl ketone, methyl-t-butyl ketone, diisobutyl ketone, cyclopentanone, and cyclohexanone. Examples of the aldehyde compound include: aliphatic aldehyde compounds, such as acetaldehyde, propionaldehyde, n-butyraldehyde, isobutyraldehyde, valeraldehyde, isovaleraldehyde, 2-methylbutylaldehyde, n-hexylaldehyde, 2-methylpentylaldehyde, n-octylaldehyde, and 3,5,5-trimethylhexylaldehyde; and aromatic aldehyde compounds, such as benzaldehyde, methylbenzaldehyde, trimethylbenzaldehyde, ethylbenzaldehyde, isopropylbenzaldehyde, isobutylbenzaldehyde, methoxybenzaldehyde, dimethoxybenzaldehyde, and trimethoxybenzaldehyde.

Of those, from the viewpoints of excellence in ease of production of the compound having a hydroxyl group and an oxazolidine ring and excellence in foaming-inhibiting performance when the one-component type curable composition to be obtained is cured, diethanolamine is preferred as the alkanolamine, and among ketone compounds or aldehyde compounds, an aldehyde compound is preferred and isobutyraldehyde, 2-methylpentylaldehyde, or benzaldehyde is more preferred. Specific examples thereof include 2-isopropyl-3-(2-hydroxyethyl)oxazolidine, 2-(1-methylbutyl)-3-(2-hydroxyethyl)oxazolidine, and 2-phenyl-3-(2-hydroxyethyl)oxazolidine.

The oxazolidine silyl ether is obtained by a dealcoholation reaction of the above-mentioned compound having a hydroxyl group and an oxazolidine ring with an alkoxysilane, such as trimethoxysilane, tetramethoxysilane, triethoxysilane, dimethoxydimethylsilane, vinyltrimethoxysilane, vinyltriethoxysilane, 3-glycidoxypropyltrimethoxysilane, and 3-glycidoxypropyltriethoxysilane.

The carbonate group-containing oxazolidine can be obtained by allowing the above-mentioned compound having a hydroxyl group and an oxazolidine ring to react with a carbonate, such as diallyl carbonate, through use of a polyhydric alcohol, such as diethylene glycol or glycerin.

The ester group-containing oxazolidine can be obtained by, for example, a reaction between the above-mentioned compound having a hydroxyl group and an oxazolidine ring and a lower alkyl ester of a dicarboxylic acid or a polycarboxylic acid.

It is preferred that the usage amount of the compound (B) having an oxazolidine ring be set so that the total amount of a secondary amino group and an alcoholic hydroxyl group that are active hydrogen generated by hydrolysis of the compound (B) having an oxazolidine ring is 0.3 mol or more, more preferably from 0.5 mol to 1.0 mol with respect to 1.0 mol of the isocyanate group content in the isocyanate group-containing urethane prepolymer (A). It is not preferred that the total amount of the active hydrogen be less than 0.3 mol because foaming-inhibiting performance tends to become insufficient.

<Regarding Component (C)>

The first curing accelerator (C) is blended so as to accelerate the reaction between at least one of a secondary amino group or a hydroxyl group generated by hydrolysis of the compound (B) having an oxazolidine ring and an isocyanate group of the isocyanate group-containing urethane prepolymer (A). When the first curing accelerator (C) is blended with a system containing the isocyanate group-containing urethane prepolymer (A), the compound (B) having an oxazolidine ring, and the second curing accelerator (D) described later, a curable composition being excellent in curing property and foaming-inhibiting performance and having satisfactory water-resistant adhesion physical properties of a cured product after curing by water can be realized. Specific suitable examples of the first curing accelerator (C) include chelate compounds of various metals, such as zirconium, bismuth, iron, cobalt, and nickel. Examples thereof include zirconium acetylacetonate, acetylacetone bismuth, iron acetylacetonate, acetylacetone cobalt, and acetylacetone nickel. Those accelerators may be used alone, or two or more kinds thereof may be used in combination. Of those, from the viewpoint of particular excellence in curing property and foaming-inhibiting performance of the one-component type curable composition, an iron chelate compound is preferred, and iron acetylacetonate is particularly preferred.

The usage amount of the first curing accelerator (C) is preferably from 0.001 part by mass to 10 parts by mass with respect to 100 parts by mass of the compound (B) having an oxazolidine ring. It is not preferred that the usage amount be less than 0.001 part by mass because the effect of accelerating the reaction between a secondary amino group and a hydroxyl group that are active hydrogen groups generated by hydrolysis of the compound (B) having an oxazolidine ring and an isocyanate group of the isocyanate group-containing urethane prepolymer (A) is small. It is not preferred that the usage amount be more than 10 parts by mass because the storage stability of the curable composition is adversely affected.

<Regarding Component (D)

The second curing accelerator (D) is blended so as to accelerate the hydrolysis of the compound (B) having an oxazolidine ring, thus accelerating the curing of the isocyanate group-containing urethane prepolymer (A), and is a ring-opening catalyst for an oxazolidine ring. Specific examples thereof include an organic carboxylic acid, an organic sulfonic acid, an organic phosphoric acid, an organic phosphorous acid, and esters or acid anhydrides thereof, an organic sulfonyl isocyanate, and an organic sulfonamide. Examples thereof include: aliphatic carboxylic acids, such as formic acid, acetic acid, propionic acid, caproic acid, oxalic acid, succinic acid, adipic acid, 2-ethylhexanoic acid, octylic acid, lauric acid, oleic acid, and stearic acid; α,β- unsaturated carboxylic acids, such as maleic acid and acrylic acid; aromatic carboxylic acids, such as phthalic acid, benzoic acid, and salicylic acid; acid anhydrides thereof; alicyclic carboxylic acids and acid anhydrides thereof; and p-toluenesulfonic acid, p-toluenesulfonic acid anhydride, p-toluenesulfonyl isocyanate, and p-toluenesulfonamide. Of those, acrylic acid and an alicyclic acid anhydride are preferred, and from the viewpoint of satisfactory storage stability, an alicyclic acid anhydride is particularly preferred. Examples of the alicyclic acid anhydride include tetrahydrophthalic anhydride, hexahydrophthalic anhydride, methyltetrahydrophtalic anhydride, methylhexahydrophthalic anhydride, methylnadic anhydride, and dimethyl butenyl tetrahydrophthalic anhydride. Those accelerators may be used alone, or two or more kinds thereof may be used in combination.

The usage amount of the second curing accelerator (D) is preferably from 0.001 part by mass to 5 parts by mass with respect to 100 parts by mass of the compound (B) having an oxazolidine ring. It is not preferred that the usage amount be less than 0.001 part by mass because the effect of accelerating the hydrolysis of the compound (B) having an oxazolidine ring is small. It is not preferred that the usage amount be more than 5 parts by mass because the curing property and storage stability of the curable composition are adversely affected.

As described above, it is necessary that the one-component type curable composition of the present invention include all the particular isocyanate group-containing urethane prepolymer (A), the compound (B) having an oxazolidine ring, the first curing accelerator (C), and the second curing accelerator (D). Through incorporation of all the components (A) to (D), the one-component type curable composition enables a cured product, satisfying (I) to (III), being excellent in weather resistance, and having remarkably high tensile strength and rubber hardness, to be obtained, while having excellent foaming-inhibiting performance. Meanwhile, in the case where even one of the components (A) to (D) is not incorporated as shown in Comparative Examples described later, (I) to (III) cannot be satisfied. It should be noted that the one-component type curable composition of the present invention is a non-yellowing composition.

The one-component type curable composition of the present invention may contain additives within a range not impairing the object of the present invention in addition to the above-mentioned components (A) to (D). As the additives, there may be given a plasticizer, a weathering stabilizer, a filler, a thixotropy-imparting agent, an adhesiveness-improving agent, a storage stability-improving agent (dehydration agent), a colorant, and an organic solvent. Any one kind of those additives may be used alone, or two or more kinds thereof may be used in combination.

The plasticizer is used for the purposes of decreasing the viscosity of the one-component type curable composition to improve workability and regulating the rubber physical properties after curing of the one-component type curable composition. Specific examples thereof include: low-molecular-weight plasticizers, for example, phthalic acid esters, such as dioctyl phthalate, diisononyl phthalate, dibutyl phthalate, and butyl benzyl phthalate, and aliphatic carboxylic acid esters, such as dioctyl adipate, diisodecyl succinate, dibutyl sebacate, and butyl oleate; and high-molecular-weight plasticizers each of which has a number average molecular weight of 1,000 or more and does not react with an isocyanate group, for example, a compound obtained by etherifying or esterifying a polyalkylene-based polyol or a polyoxyalkylene-based monool, and polystyrenes, such as poly-α-methylstyrene and polystyrene.

The one-component type curable composition of the present invention is excellent in weather resistance, and hence the weathering stabilizer may not be added thereto. However, the weathering stabilizer may be added for the purpose of preventing oxidation, light degradation, and thermal degradation of the one-component type curable composition to further improve weather resistance and heat resistance thereof. Examples of the weathering stabilizer include a hindered amine-based light stabilizer, a hindered phenol-based antioxidant, and a UV absorber. Any one kind of those weathering stabilizers may be used alone, or two or more kinds thereof may be used in combination.

Examples of the hindered amine-based light stabilizer include: low-molecular-weight compounds each having a molecular weight of less than 1,000, such as bis(2,2,6,6-tetramethyl-4-piperidyl) sebacate, decanedioic acid bis(2,2,6,6-tetramethyl-1(octyloxy)-4-piperidyl) ester, bis(1,2,2,6,6-pentamethyl-4-piperidyl) [[3,5-bis(1,1-dimethylethyl)-4-hydroxyphenyl]methyl]butylmalonate, methyl 1,2,2,6,6-pentamethyl-4-piperidyl sebacate, bis(1,2,2,6,6-pentamethyl-4-piperidyl) sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, and 4-benzoyloxy-2,2,6,6-tetramethylpiperidine; and high-molecular-weight compounds each having a molecular weight of 1,000 or more, such as a dimethyl succinate/1-(2-hydroxyethyl)-4-hydroxy-2,2,6,6-tetramethylpiperidine polycondensate, poly[{6-(1,1,3,3-tetramethylbutyl)amino-1,3,5-triazine-2,4-diyl}{(2,2,6,6-tetramethyl-4-piperidyl)imino}hexamethylene((2,2,6,6-tetramethyl-4-piperidyl)imino)], an N,N'-bis(3-aminopropyl)ethylenediamine-2,4-bis[N-butyl-N-(1,2,2,6,6-pentamethyl-4-piperidyl)amino]-6-chloro-1,3,5-triazine condensate, and ADK STAB LA-63P or LA-68LD manufactured by Adeka Corporation.

Examples of the hindered phenol-based antioxidant include pentaerythritol tetrakis[3-(3,5-di-tert-butyl-4-hydroxyphenyl)propionate], octadecyl 3-(3,5-di-tert-butyl-4-hydroxyphenyl)propionate, N,N'-hexane-1,6-diylbis[3-(3,5-di-tert-butyl-4-hydroxyphenyl)propionamide], a benzenepropanoic acid 3,5-bis(1,1-dimethylethyl)-4-hydroxy C7-C9 side-chain alkyl ester, and 2,4-dimethyl-6-(1-methylpentadecyl)phenol.

Examples of the UV absorber include: a benzotriazole-based UV absorber, such as 2-(3,5-di-tert-butyl-2-hydroxyphenyl)-5-chlorobenzotriazole; a triazine-based UV absorber, such as 2-(4,6-diphenyl-1,3,5-triazin-2-yl)-5-[(hexyl)oxy]-phenol; a benzophenone-based IV absorber, such as octabenzone; and a benzoate-based UV absorber, such as 2,4-di-tert-butylphenyl 3,5-di-tert-butyl-4-hydroxybenzoate.

Of those, from the viewpoint of the high effect of improving weather resistance, a hindered amine-based light stabilizer or a hindered phenol-based antioxidant is preferred.

The filler is used for the purposes of serving as an extender for the one-component type curable composition and reinforcing the physical properties of a cured product. Specific examples thereof include mica, kaolin, zeolite, graphite, diatomaceous earth, terra alba, clay, talc, slate powder, silicic anhydride, quartz fine powder, aluminum powder, zinc powder, synthetic silica, such as precipitated silica, inorganic powdery fillers, such as calcium carbonate, magnesium carbonate, alumina, calcium oxide, and magnesium oxide, fibrous fillers, such as glass fibers and carbon fibers, inorganic balloon fillers, such as glass balloons, Shirasu balloons, silica balloons, and ceramic balloons, and a filler obtained by treating a surface of any of the above-mentioned fillers with an organic substance, such as a fatty acid, wood powder, walnut shell powder, chaff powder, pulp powder, cotton chips, rubber powder, fine powder of a thermoplastic or thermosetting resin, powder or a hollow body of polyethylene or the like, and organic balloon fillers, such as saran microballoons, as well as flame retardancy-imparting fillers, such as magnesium hydroxide and aluminum hydroxide. The particle diameter of the filler is preferably from 0.01 µm to 1,000 µm.

The thixotropy-imparting agent is used for the purpose of preventing sagging (slump) of the one-component type curable composition. Specific examples thereof include: inorganic thixotropy-imparting agents, such as hydrophilic or hydrophobic fine powder silica and fatty acid-treated calcium carbonate; and organic thixotropy-imparting agents, such as organic bentonite and a fatty acid amide.

The adhesiveness-improving agent is used for the purpose of improving the adhesiveness of a cured product. Specific examples thereof may include various coupling agents, such as a silane-based coupling agent, an aluminum-based coupling agent, and a zircoaluminate-based coupling agent, or partially hydrolyzed and condensed products thereof. Of those, a silane-based coupling agent or a partially hydrolyzed and condensed product thereof is preferred due to excellent adhesiveness.

Examples of the silane-based coupling agent may include low-molecular-weight compounds each having a molecular weight of 500 or less, preferably 400 or less and containing an alkoxysilyl group, such as vinyltrimethoxysilane, vinylmethyldimethoxysilane, 3-(meth)acryloxypropyltrimethoxysilane, 3-(meth)acryloxypropylmethyldimethoxysilane, 3-mercaptopropyltrimethoxysilane, 3-aminopropyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropylmethyldiethoxysilane, 3-glycidoxypropyltrimethoxysilane, and 3-glycidoxypropylmethyldiethoxysilane, and a partially hydrolyzed and condensed product of one kind or two or more kinds of these silane-based coupling agents, the product being a compound having a molecular weight of from 200 to 3,000.

The storage stability-improving agent (dehydration agent) is used for the purpose of improving the storage stability of the one-component type curable composition. Specific examples thereof include vinyltrimethoxysilane, calcium oxide, and p-toluenesulfonyl isocyanate (PTSI), which function as the dehydration agent by a reaction with water that is present in the one-component type curable composition.

The colorant is used for the purpose of coloring the one-component type curable composition to impart a design property to a cured product. Specific examples thereof include: inorganic pigments, such as titanium oxide and iron oxide; organic pigments, such as copper phthalocyanine; and carbon black.

The organic solvent is used for the purpose of decreasing the viscosity of the one-component type curable composition to improve the workability of extrusion and application. As the organic solvent, any organic solvent can be used without any particular limitation as long as the organic solvent does not react with the above-mentioned components (A) to (D). Specific examples thereof include: ester-based solvents, such as ethyl acetate; ketone-based solvents, such as methyl ethyl ketone; aliphatic solvents, such as n-hexane; naphthene-based solvents, such as methylcyclohexane, ethylcyclohexane, and dimethylcyclohexane; and aromatic solvents, such as toluene and xylene. It should be noted that the organic solvent may be used during synthesis of the components (A) to (D) and may also be used during preparation of the one-component type curable composition.

The one-component type curable composition of the present invention can be produced by mixing the above-mentioned components (A) to (D), and the additives to be added as necessary.

The one-component type curable composition of the present invention can be cured by reacting with water, such as moisture in air, at room temperature (for example, 23° C.). As a specific application of the one-component type curable composition of the present invention, for example, there are given sealing members, waterproofing materials, and adhesives for construction, civil engineering, or automobiles.

In the case of application using the one-component type curable composition of the invention, as a material (member) to be subjected to the application, there may be given, for example: inorganic materials, such as mortar, concrete, autoclaved lightweight concrete (ALC), glass, marble, granite, a siding, a tile, a roof tile, and a brick; metal materials, such as iron, copper, stainless steel, a galvanium steel plate, galvanized iron, aluminum, and titanium; a material made of a synthetic resin, such as an acrylic resin, a polyester resin, vinyl chloride, an acrylonitrile-butadiene-styrene copolymer (ABS), or a fiber reinforced plastic (FRP); and wood materials, such as a timber and a plywood. The one-component type curable composition of the present invention may be, for example, applied to the above-mentioned materials to be subjected to the application, followed by curing by a reaction with water, such as moisture.

In the one-component type curable composition of the present invention, the generation of gas during curing is suppressed by virtue of excellent foaming-inhibiting performance. Therefore, the troubles such as degradation in outer appearance, fracture of a cured product, and decrease in adhesiveness, which are caused by the generation of air bubbles of carbon dioxide in the cured product, can be suppressed. In addition, as described above, a cured product obtained by allowing the one-component type curable composition of the present invention to react with water to be cured satisfies the following: (I) type D durometer hardness specified under JIS K 6253-3 is D40 or more, preferably D50 or more, more preferably D55 or more; (II) tensile strength at 23° C. specified under JIS A 6021 is 10 N/mm$^2$ or more; and (III) accelerated weather resistance specified under JIS K 5658 complies with a first class. Thus, the cured product is remarkably excellent in weather resistance and has high tensile strength and rubber hardness. Accordingly, the cured product can be suitably used for waterproofing materials and the like in applications requiring high durability (weather resistance, tensile strength, rubber hardness). Further, the cured product may be used alone by virtue of high durability and enables application to be performed even without using a topcoat that may be applied to the surface of the cured product of the one-component type curable composition.

EXAMPLES

Hereinafter, the present invention is described in more detail by way of Examples and the like. However, the present invention is not limited thereto.

Synthesis Example 1

Synthesis of Urethane Bond-Containing Oxazolidine Compound O-1

420 g of diethanolamine (molecular weight: 105), 177 g of toluene, and 317 g of isobutyraldehyde (molecular weight: 72.1) were loaded into a reaction vessel equipped with a stirrer, a thermometer, a nitrogen seal tube, an ester tube, and a heating and cooling device while introducing nitrogen gas. The mixture was heated with stirring and subjected to a reflux dehydration reaction at from 110° C. to 150° C. while removing water (71.9 g) generated as a by-product out of the system. After no distillation of water came to be recognized, the resultant was further heated under reduced pressure (50 hPa to 70 hPa) to remove toluene and unreacted isobutyraldehyde, to thereby obtain N-hydroxyethyl-2-isopropyloxazolidine as an intermediate reaction product. Then, 336 g of hexamethylene diisocyanate (molecular weight: 168) was added to 636 g of the obtained N-hydroxyethyl-2-isopropyloxazolidine, and the mixture was heated at 80° C. for 8 hours. When an NCO content actually measured by titration reached 0.0 mass %, the reaction was finished to obtain a urethane bond-containing oxazolidine compound O-1 having two oxazolidine rings in one molecule. The obtained urethane bond-containing oxazolidine compound O-1 was a liquid at normal temperature.

Production of One-Component Type Curable Composition

Waterproofing Material

Example 1

100 g of polyoxypropylene diol (manufactured by Asahi Glass Co., Ltd., PREMINOL 4001, number average molecular weight: 2,854), 17.9 g of a bisphenol skeleton-containing polyether polyol (manufactured by Adeka Corporation, Adeka Polyether BPX-33, number average molecular weight: 798: a polyether-based diol obtained by allowing 6 mol of propylene oxide to react with 1 mol of bisphenol A), 3.6 g of epoxy acrylate containing two or more hydroxyl groups in one molecule (manufactured by Kyoeisha Chemical Co., Ltd., Epoxy Ester 70PA: $CH_2$=$CHCOOCH_2CH$(OH) $CH_2OCH_2CH(CH_3)OCH_2CH(OH)CH_2OCOCH$=$CH_2$), and 33.3 g of a naphthene-based solvent (manufactured by Maruzen Petrochemical Co., Ltd., Suwa Clean 150) were loaded into a reaction vessel equipped with a stirrer, a thermometer, a nitrogen seal tube, and a heating and cooling device while introducing nitrogen gas. While the mixture was stirred, 216.3 g of heavy calcium carbonate and 7.2 g of titanium oxide each of which had been dried in advance in a drier at from 100° C. to 110° C. to have a water content of 0.05 mass % or less were successively loaded into the reaction vessel. The mixture was kneaded for 1 hour until the mixture became uniform. Then, 61.7 g of isophorone diisocyanate and 0.01 g of inorganic bismuth (manufactured by Nitto Kasei Co., Ltd., Neostan U-600) serving as a reaction catalyst were loaded into the reaction vessel. The mixture was heated to from 75° C. to 80° C. to be allowed to react for 3 hours, and then the mixture was cooled to room temperature. The reaction molar ratio at this time (number of moles of an isocyanate group/number of moles of a hydroxyl group of a raw material) is 3.0. In addition, an isocyanate group-containing urethane prepolymer (A) obtained in this reaction had an isocyanate group content of 8.51 mass %. Then, 2.7 g of a hindered phenol-based antioxidant (manufactured by BASF Japan Co., Ltd., IRGANOX 245), 1.8 g of a hindered amine-based light stabilizer (manufactured by Adeka Corporation, ADK STAB LA-63P), 1.1 g of hydrophobized silica (manufactured by Tokuyama Corporation, Reolosil DM-10), and 45.1 g of the urethane bond-containing oxazolidine compound O-1 were loaded into the reaction vessel, and the mixture was kneaded further for 30 minutes until the mixture became uniform. Then, 0.04 g of iron(III) acetylacetonate (manufactured by Wako Pure Chemical Industries, Ltd.) and 0.54 g of an alicyclic acid anhydride (manufactured by Hitachi Chemical Co., Ltd., HN-2200: methyl-1,2,3,6-tetrahydrophthalic anhydride) were added to the mixture. The resultant was mixed further for 30 minutes. After that, the resultant was defoamed under a reduced pressure of from 50 hPa to 100 hPa, and filled and sealed into a rectangular container made of tin, to thereby produce a curable composition S-1.

The obtained curable composition S-1 was a viscous white liquid at normal temperature, having a viscosity at 25° C. measured with a B-type rotary viscometer of 2,500 mPa·s.

Example 2

A curable composition S-2 was produced in the same way as in Example 1 except that acrylic acid was used in place of the alicyclic acid anhydride. It should be noted that the obtained isocyanate group-containing urethane prepolymer (A) had an isocyanate group content of 8.51 mass %.

The obtained curable composition S-2 was a viscous white liquid at normal temperature, having a viscosity at 25° C. measured with a B-type rotary viscometer of 2,500 mPa·s.

Example 3

A curable composition S-3 was produced in the same way as in Example 1 except that a castor oil-based polyol (manufactured by Hokoku Corporation, HS 3P-255, number average molecular weight: 956) was used in place of the bisphenol skeleton-containing polyether polyol, and the blending amounts were set to those shown in Table 1. It should be noted that the obtained isocyanate group-containing urethane prepolymer (A) had an isocyanate group content of 9.14 mass %.

The obtained curable composition S-3 was a viscous white liquid at normal temperature, having a viscosity at 25° C. measured with a B-type rotary viscometer of 2,500 mPa·s.

Example 4

A curable composition S-4 was produced in the same way as in Example 1 except that lead acetate was used in place of the iron(III) acetylacetonate. It should be noted that the obtained isocyanate group-containing urethane prepolymer (A) had an isocyanate group content of 8.51 mass %.

The obtained curable composition S-4 was a viscous white liquid at normal temperature, having a viscosity at 25° C. measured with a B-type rotary viscometer of 2,500 mPa·s.

Example 5

A curable composition S-5 was produced in the same way as in Example 1 except that polyoxypropylene diol (manufactured by Asahi Glass Co., Ltd., EXCENOL 1020, number average molecular weight: 1,376) was used in place of the polyoxypropylene diol (PREMINOL 4001), and the blending amounts were set to those shown in Table 1. It should be noted that the obtained isocyanate group-containing urethane prepolymer (A) had an isocyanate group content of 11.05 mass %.

The obtained curable composition S-5 was a viscous white liquid at normal temperature, having a viscosity at 25° C. measured with a B-type rotary viscometer of 2,800 mPa·s.

Comparative Example 1

A comparative curable composition S-1 was produced in the same way as in Example 1 except that polyoxypropylene triol (manufactured by Asahi Glass Co., Ltd., PREMINOL 3012, number average molecular weight: 14,407) was used in place of the polyoxypropylene diol (PREMINOL 4001), and the blending amounts were set to those shown in Table 1. It should be noted that the obtained isocyanate group-containing urethane prepolymer had an isocyanate group content of 5.89 mass %.

The obtained comparative curable composition S-1 was a viscous white liquid at normal temperature, having a viscosity at 25° C. measured with a B-type rotary viscometer of 9,000 mPa·s.

Comparative Example 2

A comparative curable composition S-2 was produced in the same way as in Example 1 except that 117.9 g of the polyoxypropylene diol (PREMINOL 4001) was used, the bisphenol skeleton-containing polyether polyol was not used, and the blending amounts were set to those shown in Table 1. It should be noted that the obtained isocyanate group-containing urethane prepolymer had an isocyanate group content of 7.04 mass %.

The obtained comparative curable composition S-2 was a viscous white liquid at normal temperature, having a viscosity at 25° C. measured with a B-type rotary viscometer of 2,000 mPa·s.

Comparative Example 3

A comparative curable composition S-3 was produced in the same way as in Example 1 except that 103.6 g of the polyoxypropylene diol (PREMINOL 4001) was used, the epoxy acrylate containing two or more hydroxyl groups in one molecule was not used, and the blending amounts were set to those shown in Table 2. It should be noted that the obtained isocyanate group-containing urethane prepolymer had an isocyanate group content of 7.94 mass %.

The obtained comparative curable composition S-3 was a viscous white liquid at normal temperature, having a viscosity at 25° C. measured with a B-type rotary viscometer of 2,500 mPa·s.

Comparative Example 4

A comparative curable composition S-4 was produced in the same way as in Example 1 except that the 0-1 was not used. It should be noted that the obtained isocyanate group-containing urethane prepolymer had an isocyanate group content of 8.51 mass %.

The obtained comparative curable composition S-4 was a viscous white liquid at normal temperature, having a viscosity at 25° C. measured with a B-type rotary viscometer of 3,000 mPa·s.

Comparative Example 5

A comparative curable composition S-5 was produced in the same way as in Example 1 except that the iron(III) acetylacetonate was not used. It should be noted that the obtained isocyanate group-containing urethane prepolymer had an isocyanate group content of 8.51 mass %.

The obtained comparative curable composition S-5 was a viscous white liquid at normal temperature, having a viscosity at 25° C. measured with a B-type rotary viscometer of 2,500 mPa·s.

Comparative Example 6

A comparative curable composition S-6 was produced in the same way as in Example 1 except that the alicyclic acid anhydride was not used. It should be noted that the obtained isocyanate group-containing urethane prepolymer had an isocyanate group content of 8.51 mass %.

The obtained comparative curable composition S-6 was a viscous white liquid at normal temperature, having a viscosity at 25° C. measured with a B-type rotary viscometer of 2,500 mPa·s.

Comparative Example 7

A comparative curable composition S-7 was produced in the same way as in Example 1 except that polyoxypropylene diol (manufactured by Sanyo Chemical Industries, Ltd., SANNIX PP-4000, number average molecular weight: 4,024) was used in place of the polyoxypropylene diol (PREMINOL 4001), and the blending amounts were set to those shown in Table 2. It should be noted that the obtained isocyanate group-containing urethane prepolymer had an isocyanate group content of 6.78 mass %.

The obtained comparative curable composition S-7 was a viscous white liquid at normal temperature, having a viscosity at 25° C. measured with a B-type rotary viscometer of 4,300 mPa·s.

Comparative Example 8

A comparative curable composition S-8 was produced in the same way as in Example 1 except that a bisphenol skeleton-containing polyether polyol (manufactured by Adeka Corporation, Adeka Polyether BPX-1000, number average molecular weight 1,389: a polyether-based diol obtained by allowing 13 mol of propylene oxide to react with 1 mol of bisphenol A) was used in place of the bisphenol skeleton-containing polyether polyol (Adeka Polyether BPX-33), and the blending amounts were set to those shown in Table 2. It should be noted that the obtained isocyanate group-containing urethane prepolymer had an isocyanate group content of 7.65 mass %.

The obtained comparative curable composition S-8 was a viscous white liquid at normal temperature, having a viscosity at 25° C. measured with a B-type rotary viscometer of 3,000 mPa·s.

Comparative Example 9

A comparative curable composition S-9 was produced in the same way as in Example 1 except that a bisphenol skeleton-containing polyether polyol (manufactured by Adeka Corporation, Adeka Polyether BPX-2000, number average molecular weight 2,671: a polyether-based diol obtained by allowing 30 mol of propylene oxide to react with 1 mol of bisphenol A) was used in place of the bisphenol skeleton-containing polyether polyol (Adeka Polyether BPX-33), and the blending amounts were set to those shown in Table 2. It should be noted that the obtained isocyanate group-containing urethane prepolymer had an isocyanate group content of 7.04 mass %.

The obtained comparative curable composition S-9 was a viscous white liquid at normal temperature, having a viscosity at 25° C. measured with a B-type rotary viscometer of 3,400 mPa·s.

(Test Method)

The obtained curable composition was poured into a mold form subjected to mold release treatment to have a thickness of about 2.5 mm while care was taken so that bubbles were not involved. The curable composition was left to stand in a chamber at 23° C. and a relative humidity of 50% for 4 days, and then removed from the mold form. The resultant was left to stand further for 3 days under the same conditions to be cured, to thereby produce a cured sheet as a test body (cured product).

1) Durometer Hardness

A type D durometer hardness test was conducted through use of the produced test body in conformity to JIS K 6253-3:2012 "Rubber, Vulcanized or Thermoplastic—Determination of Hardness—Part 3: Durometer Hardness", to thereby determine durometer hardness.

2) Tensile Strength

A test was conducted through use of the produced test body in Dumbbell No. 3 specified under JIS K 6251 by JIS A 6021:2011 "Liquid-applied Compounds for Waterproofing Membrane Coating of Buildings" and "6.6.1 Tensile Performance Test at 23° C.", to thereby determine tensile strength.

3) Accelerated Weather Resistance

Color difference, gloss retention ratio, and rating of chalking after irradiation of 2,500 hours were determined and evaluated through use of the produced test body in the same way as in JIS K 5658:2010 "Long durable top coats for constructions" and "7.16 Accelerated Weather Resistance" except that the test body was mounted on a flexible plate. The case where there were no cracks and swelling in the test body, a color difference value of a sample specimen was not larger than that of a standard specimen, the rating of chalking was 1 or 0, and the gloss retention ratio was 80% or more (that is, the case where the accelerated weather resistance specified under JIS K 5658 complied with a first class) was evaluated as "○", and the case where any of the conditions was not satisfied (that is, the case where accelerated weather resistance specified under JIS K 5658 did not comply with a first class) was evaluated as "x".

4) Foaming Property

The obtained curable composition was collected into a paper cup to have a thickness of 10 mm and left to stand in an oven at 50° C. and a relative humidity of 80% for 7 days. The curable composition was taken out of the oven and cut vertically with a cutter, and the cross-section thereof was checked. The case where there were no bubbles on the cross-section was evaluated as "○", and the case where there were bubbles on the cross-section was evaluated as "x".

The evaluation results are shown in Tables 1 and 2. Further, the blending amounts (g) of each Example and each Comparative Example are also shown in Tables 1 and 2.

TABLE 1

|  | Example 1 | Example 2 | Example 3 | Example 4 | Example 5 | Comparative Example 1 | Comparative Example 2 |
|---|---|---|---|---|---|---|---|
| Polyoxypropylene diol (number average molecular weight: 2,854) | 100.0 | 100.0 | 100.0 | 100.0 | — | — | 117.9 |
| Polyoxypropylene diol (number average molecular weight: 1,376) | — | — | — | — | 100.0 | — | — |
| Polyoxypropylene triol (number average molecular weight: 14,407) | — | — | — | — | — | 100.0 | — |
| Polyoxypropylene diol (number average molecular weight: 4,024) | — | — | — | — | — | — | — |
| Bisphenol skeleton-containing polyether polyol (number average molecular weight: 798) | 17.9 | 17.9 | — | 17.9 | 17.9 | 17.9 | — |
| Castor oil-based polyol (number average molecular weight: 956) | — | — | 17.9 | — | — | — | — |
| Bisphenol skeleton-containing polyether polyol (number average molecular weight: 1,389) | — | — | — | — | — | — | — |
| Bisphenol skeleton-containing polyether polyol (number average molecular weight: 2,671) | — | — | — | — | — | — | — |
| Epoxy acrylate having two or more hydroxyl groups in one molecule | 3.6 | 3.6 | 3.6 | 3.6 | 3.6 | 3.6 | 3.6 |
| Naphthene-based solvent | 33.3 | 33.3 | 33.3 | 33.3 | 33.3 | 33.3 | 33.3 |
| Heavy calcium carbonate | 216.3 | 216.3 | 216.3 | 216.3 | 216.3 | 216.3 | 216.3 |
| Titanium oxide | 7.2 | 7.2 | 7.2 | 7.2 | 72 | 7.2 | 7.2 |
| Isophorone diisocyanate (IPDI) | 61.7 | 61.7 | 68.7 | 61.7 | 94.6 | 49.0 | 47.0 |
| Reaction catalyst | 0.01 | 0.01 | 0.01 | 0.01 | 0.01 | 0.01 | 0.01 |
| Hindered amine-based light stabilizer | 1.8 | 1.8 | 1.8 | 1.8 | 1.8 | 1.8 | 1.8 |
| Hindered amine-based antioxidant | 2.7 | 2.7 | 2.7 | 2.7 | 2.7 | 2.7 | 2.7 |
| Hydrophobic silica | 1.1 | 1.1 | 1.1 | 1.1 | 1.1 | 1.1 | 1.1 |
| Urethane bond-containing oxazolidine compound O-1 | 45.1 | 45.1 | 50.1 | 45.1 | 69.1 | 35.7 | 34.3 |

TABLE 1-continued

|  | Example 1 | Example 2 | Example 3 | Example 4 | Example 5 | Comparative Example 1 | Comparative Example 2 |
|---|---|---|---|---|---|---|---|
| Iron(III) acetylacetonate | 0.04 | 0.04 | 0.04 | — | 0.04 | 0.04 | 0.04 |
| Lead acetate | — | — | — | 0.04 | — | — | — |
| Acrylic acid | — | 0.54 | — | — | — | — | — |
| Alicyclic acid anhydride | 0.54 | — | 0.54 | 0.54 | 0.54 | 0.54 | 0.54 |
| Total | 491.29 | 491.29 | 503.29 | 491.29 | 548.19 | 469.19 | 465.79 |
| Durometer hardness (D) | 60 | 59 | 61 | 59 | 58 | 45 | 22 |
| Tensile strength [N/mm$^2$] | 13.4 | 11.7 | 10.5 | 11.5 | 15.1 | 8.7 | 4.9 |
| Weather resistance | ○ | ○ | ○ | ○ | ○ | ○ | ○ |
| Foaming property | ○ | ○ | ○ | ○ | ○ | ○ | ○ |

TABLE 2

|  | Comparative Example 3 | Comparative Example 4 | Comparative Example 5 | Comparative Example 6 | Comparative Example 7 | Comparative Example 8 | Comparative Example 9 |
|---|---|---|---|---|---|---|---|
| Polyoxypropylene diol (number average molecular weight: 2,854) | 103.6 | 100.0 | 100.0 | 100.0 | — | 100.0 | 100.0 |
| Polyoxypropylene diol (number average molecular weight: 1,376) | — | — | — | — | — | — | — |
| Polyoxypropylene triol (number average molecular weight: 14,407) | — | — | — | — | — | — | — |
| Polyoxypropylene diol (number average molecular weight: 4,024) | — | — | — | — | 100.0 | — | — |
| Bisphenol skeleton-containing polyether polyol (number average molecular weight: 798) | 17.9 | 17.9 | 17.9 | 17.9 | 17.9 | — | — |
| Castor oil-based polyol (number average molecular weight: 956) | — | — | — | — | — | — | — |
| Bisphenol skeleton-containing polyether polyol (number average molecular weight: 1,389) | — | — | — | — | — | 17.9 | — |
| Bisphenol skeleton-containing polyether polyol (number average molecular weight: 2,671) | — | — | — | — | — | — | 17.9 |
| Epoxy acrylate having or more hydroxyl groups in one molecule | — | 3.6 | 3.6 | 3.6 | 3.6 | 3.6 | 3.6 |
| Naphthene-based solvent | 33.3 | 33.3 | 33.3 | 33.3 | 33.3 | 33.3 | 33.3 |
| Heavy calcium carbonate | 216.3 | 216.3 | 216.3 | 216.3 | 216.3 | 216.3 | 216.3 |
| Titanium oxide | 7.2 | 7.2 | 7.2 | 7.2 | 7.2 | 7.2 | 7.2 |
| Isophorone diisocyanate (IPDI) | 55.6 | 61.7 | 61.7 | 61.7 | 44.1 | 52.3 | 46.6 |
| Reaction catalyst | 0.01 | 0.01 | 0.01 | 0.01 | 0.01 | 0.01 | 0.01 |
| Hindered amine-based light stabilizer | 1.8 | 1.8 | 1.8 | 1.8 | 1.8 | 1.8 | 1.8 |
| Hindered amine-based antioxidant | 2.7 | 2.7 | 2.7 | 2.7 | 2.7 | 2.7 | 2.7 |
| Hydrophobic silica | 1.1 | 1.1 | 1.1 | 1.1 | 1.1 | 1.1 | 1.1 |
| Urethane bond-containing oxazolidine compound O-1 | 40.6 | — | 45.1 | 45.1 | 32.2 | 38.4 | 34.1 |
| Iron(III) acetylacetonate | 0.04 | 0.04 | — | 0.04 | 0.04 | 0.04 | 0.04 |
| Lead acetate | — | — | — | — | — | — | — |
| Acrylic acid | — | — | — | — | — | — | — |
| Alicyclic acid anhydride | 0.54 | 0.54 | 0.54 | — | 0.54 | 0.54 | 0.54 |
| Total | 480.69 | 446.19 | 491.25 | 490.75 | 460.79 | 475.49 | 465.19 |
| Durometer hardness (D) | 53 | 15 | 38 | 34 | 40 | 36 | 30 |
| Tensile strength [N/mm$^2$] | 10.3 | 4.5 | 7.7 | 7.6 | 8.1 | 7.7 | 6.1 |
| Weather resistance | x | ○ | ○ | ○ | ○ | ○ | ○ |
| Foaming property | ○ | x | ○ | ○ | ○ | ○ | ○ |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-253941, filed Dec. 16, 2014, which is hereby incorporated by reference herein in its entirety.

What is claimed is:

1. A one-component type curable composition, comprising:
an isocyanate group-containing urethane prepolymer (A) obtained by allowing a polyoxyalkylene-based polyol (a-1) having a number average molecular weight of 1,000 or more and less than 3,000, a polyol (a-2) having a number average molecular weight of less than 1,000, a (meth)acrylate (a-3) containing two or more hydroxyl groups in one molecule, and isophorone diisocyanate (a-4) to react with each other, wherein the (meth)acrylate (a-3) is a compound obtained by allowing all the epoxy groups in an epoxy compound containing two or more epoxy groups in one molecule to react with (meth)acrylic acid;
a compound (B) having an oxazolidine ring;
a first curing accelerator (C) configured to accelerate a reaction between at least one of a secondary amino group or a hydroxyl group generated by hydrolysis of the compound (B) having an oxazolidine ring and an isocyanate group of the isocyanate group-containing urethane prepolymer (A); and a second curing accelerator (D) configured to accelerate the hydrolysis of the compound (B) having an oxazolidine ring, wherein a cured product obtained by curing the one-component type curable composition with water satisfies the following (I) to (III):

(I) type D durometer hardness specified under JIS K 6253-3 is D40 or more;

(II) tensile strength at 23° C. specified under JIS A 6021 is 10 N/mm$^2$ or more; and (III) accelerated weather resistance specified under JIS K 5658 complies with a first class.

2. A one-component type curable composition according to claim 1, wherein the polyol (a-2) having a number average molecular weight of less than 1,000 is a bisphenol skeleton-containing polyether polyol obtained by allowing an alkylene oxide having 2 to 4 carbon atoms to react with a bisphenol compound.

3. A one-component type curable composition according to claim 1, wherein the second curing accelerator (D) is an alicyclic acid anhydride.

4. A one-component type curable composition according to claim 1, wherein the first curing accelerator (C) is an iron chelate compound.

5. A one-component type curable composition according to claim 1, wherein the compound (B) having an oxazolidine ring is a urethane bond-containing oxazolidine compound.

6. A one-component type waterproofing material, comprising the one-component type curable composition of claim 1.

* * * * *